June 21, 1960

E. H. HARTEL 2,941,757

JETTISONED WHEEL FOR AIRCRAFT

Filed Aug. 30, 1955

INVENTOR.
ERWIN H. HARTEL
BY
ATTORNEY

June 21, 1960 E. H. HARTEL 2,941,757
JETTISONED WHEEL FOR AIRCRAFT
Filed Aug. 30, 1955 2 Sheets-Sheet 2

INVENTOR.
ERWIN H. HARTEL
BY
ATTORNEY ated June 21, 1960

2,941,757
JETTISONED WHEEL FOR AIRCRAFT

Erwin H. Hartel, Cleveland, Ohio, assignor to Cleveland Pneumatic Industries, Inc., Cleveland, Ohio, a corporation of Ohio Filed Aug. 30, 1955, Ser. No. 531,439

4 Claims. (Cl. 244—103)

This invention relates to mounting wheels on landing gears and more particularly to a new and improved wheel mounting mechanism which permits the jettisoning of a wheel from a landing gear when the airplane is in flight.

It is an important object of this invention to provide a landing gear on which an additional wheel may be mounted to assist in carrying the load of the aircraft on the ground when it is heavily loaded and which may be jettisoned after the aircraft is air-borne.

It is another important object of this invention to provide a wheel mounting mechanism particularly adapted for use in aircraft landing gears which permits the jettisoning of the wheel.

It is still another object of this invention to provide a mechanism capable of operating with a very small actuating force which is suitable for use in the mounting of a wheel on an aircraft landing gear wherein the mechanism is operable to release the mounting of the wheel from the landing gear.

It is still another object of this invention to provide a releasable latching mechanism for securing a wheel on a landing gear which can be released with a very small force operating through a relatively short distance.

Further objects and advantages will appear from the following description and drawings, wherein.

In many of the more modern aircraft the take-off weight is substantially greater than the landing weight because of the large amounts of fuel carried by the aircraft which are expended during a flight. For this reason it is often necessary to provide either larger wheels or more wheels than would be necessary if only the landing weight of the aircraft were to be considered. It is therefore desirable in many of these modern aircraft to provide additional wheels which may be mounted on the landing gear to support the weight of the aircraft prior to and during take-off which additional wheels may be jettisoned once the aircraft is air-borne. This results in a two-fold advantage of reducing the flying weight of the aircraft as well as reducing the amount of space necessary for the storage of the retracted landing gear.

A releasable mounting structure according to this invention may be actuated by a very small force such as a force developed by a light-weight solenoid while still providing a rugged dependable structure which is able to withstand the impacts and stresses which occur in the wheel of an aircraft.

Figure 1:
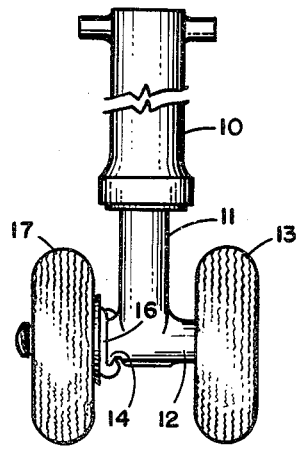
Figure 1 is a front elevation of a typical landing gear or strut incorporating a wheel mounted thereon with a mechanism according to this invention.
Figure 2:
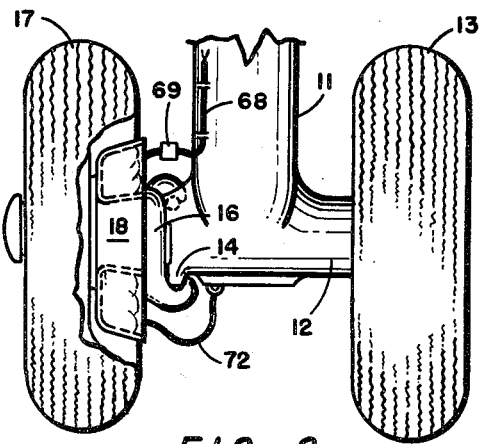
Figure 2 is an enlarged fragmentary front elevation partially in section showing the structure of the releasable wheel.

Referring to the drawings, Figure 1 shows a landing gear consisting of the usual shock absorbing mechanism wherein upper and lower telescoping members 10 and 11 are used. The upper telescoping member 10 is adapted to be mounted on the frame of an aircraft and the lower telescoping member 11 is the element on which the wheels are mounted. The conventional type of shock absorbing mechanism is incorporated in the two telescoping members, however, since it forms no part of this invention it has not been shown. The lower telescoping member 11 is formed with a laterally extending axle portion 12 on which is journaled a permanently mounted landing wheel 13. On the other side of the lower telescoping member 11 opposite the axle portion 12 is a contoured flanged portion 14 which is adapted to cooperate with the locking mechanism of a detachable axle 16 on which is journaled a wheel 17. Mounted on the detachable axle 16 is a parachute container 18 in which is stored a parachute which automatically opens after the wheel 17 is jettisoned so that the wheel will not be damaged when it reaches the ground.

Figure 3:
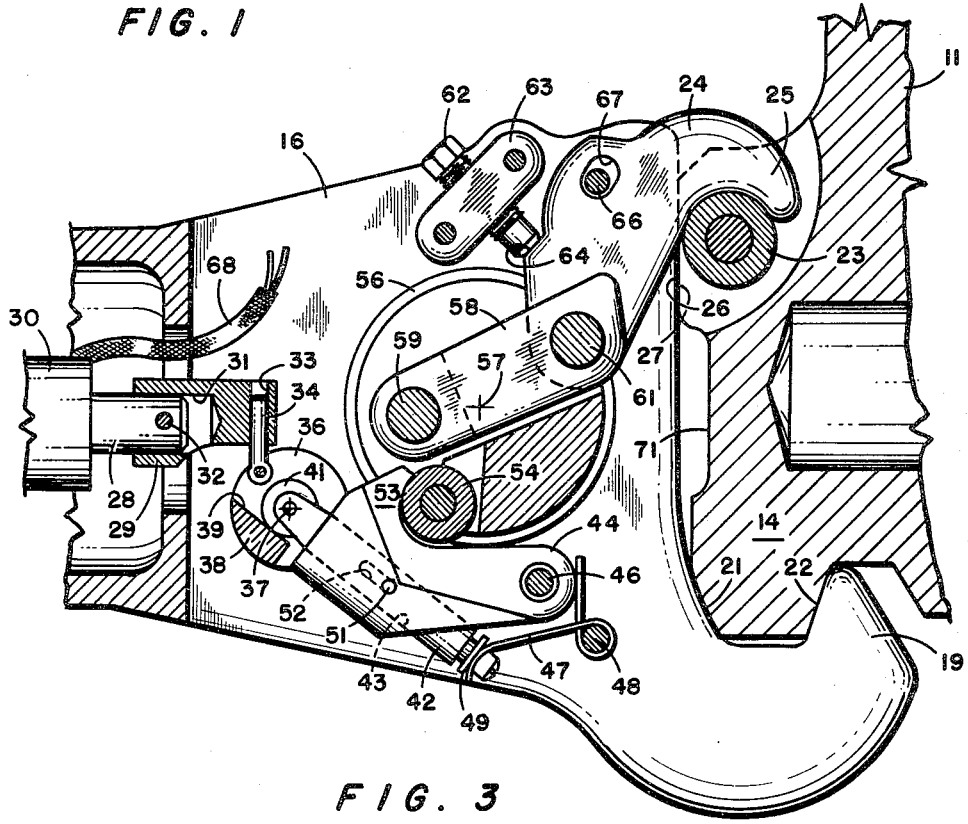
Figure 3 is an enlarged fragmentary view of the mounting mechanism shown in the locked or mounted position.

Reference should be made to Figure 3 for the structural details of the mounting mechanism. The detachable axle 16 is formed with a lower hook 19 which fits around the lower side of the flanged portion 14 and provides surfaces 21 and 22 which engage the flanged portion 14 and prevent upward or lateral movement of the detachable axle 16 relative to the lower telescoping member 11. A roller 23 is mounted on the lower telescoping member 11 at a point vertically spaced from the flanged portion 14 and is positioned for engagement by a connection element 24 mounted on the detachable axle 16 and formed with a hook 25. The hook 25 is proportioned to prevent downward and counter clockwise movement between the axle 16 and the lower telescoping member 11. The surfaces 26 and 27 formed on the lower telescoping member 11 and the detachable axle 16 respectively are pressed into engagement by the operation of the hooks 19 and 25 so no motion between the axle 16 and the lower telescoping member 11 is possible in the locked position.

The releasing mechanism itself may be actuated by a very small axial force on a plunger 28 of a solenoid 30 which is mounted in the detachable axle 16. An end member 29 is formed with a longitudinal bore 31 into which the end of the plunger 28 projects and a cross pin 32 prevents relative motion therebetween. The end member 29 is also formed with a cross bore 33 into which projects a pin 34 which is connected to a cam wheel 36 mounted on the detachable axle 16 for rotation around its pivot axis 37. The pin 34 can slide into and out of the cross bore 33 so that axial motion of the plunger 28 and in turn the end member 29 will cause rotation of the cam wheel 36 around its pivot axis 37.

The cam wheel 36 is formed with a cam segment 38 having a flat surface 39 which is engaged by a roller cam follower 41 when the elements are in the locked position shown in Figure 3. The cam follower 41 is mounted on plunger 42 which extends through a bore 43 in a latch lever 44 so that it can move axially but not laterally relative thereto. The latch lever 44 is pivoted on the detachable axle 16 by a pivot pin 46 so that it can rotate around the axis of the pivot pin and carry the plunger 42 in its rotation. A torque spring 47 engages the end of the latch lever 44, extends around a pin 48 and engages a shoulder 49 on the plunger 42 thereby producing a force resiliently urging the plunger to the left as shown in Figure 3. A cross pin 51 mounted on the latch lever 44 extends through a slot 52 formed in the plunger 42 and limits the motion of the plunger under the influence of the spring 47 so that the plunger normally assumes the position shown in Figure 3. In this position the center of the cam follower 41 is co-axial with the axis of the cam wheel 36 so the line of action of the engagement force between the cam follower 41 and the cam segment 38 passes through the pivot axis 37 and does not produce a force tending to rotate the cam wheel 36. Therefore regardless of the force between these two surfaces, there will be no tendency for the cam wheel 36 to rotate to an unlocked position. The elements are also proportioned so that the surface 39 is parallel to the axis of the plunger 42 when the elements are in the position shown in Figure 3 so there will be no component of force tending to move the plunger 42 relative to the latch lever 44.

The latch lever 44 is formed with a hook portion 53 which is proportioned to engage a roller 54 pivotally mounted on a toggle wheel 56 which is in turn journaled for rotation on the detachable axle 16 around a pivot axis 57. A toggle link 58 is pivotally connected to the toggle wheel 36 at 59, and to the connecting element 24 at 61. The line of action of the toggle link 58 which is the line between the axes of the pivots 59 and 61 is above the pivot axis 57 so that a tension force in the toggle link 58 tends to rotate the toggle wheel 56 in a clockwise direction, thus maintaining the roller 54 against the hook portion 53.

An adjusting screw 62 extends through a screw bracket 63 mounted on the detachable axle 16 and is proportioned to engage a flat surface 64 formed on the connecting element 24. The connecting element 24 is therefore supported at three points, namely, the flat surface 64 which engages the adjustable screw 62, the engagement between the roller 23 and the hook 25 and the pivot 61. Any force tending to move the detachable axle 16 downwardly relative to the lower telescoping member 11 urges the connecting element 24 in a counter clockwise direction around the point of engagement between the flat surface 64 and the adjusting screw 62. This produces tension in the toggle link 58 which resists the motion. As explained previously, tension in the toggle link 58 urges the toggle wheel 56 in a clockwise direction which rotation is prevented by the engagement between the roller 54 and the hook portion 53 on the latch lever 44. The adjusting screw 62 may be threaded toward or away from the flat surface 64 to provide a limited amount of adjustment to insure that the detachable axle is tightly mounted on the lower telescoping member 11 when the elements are in the position shown in Figure 3. A pin 66 mounted on the detachable axle 16 extends through a slot 67 formed in the latch element 24 but does not engage the walls of the slot when the detachable axle is mounted.

In operation when the detachable axle 16 is mounted on the lower telescoping member 11, the adjusting screw 62 is adjusted to provide a preload so that the engagement between the hook 25 and the roller 23 produces a force tending to rotate the connecting element 24 in a counter clockwise direction. This produces tension in the toggle link 58 which tends to rotate the toggle wheel 56 in a clockwise direction. Rotation in this direction is prevented at this time by the engagement between the roller 54 and the hook portion 53 of the latch lever 44. The point of engagement between the hook portion 53 and the roller 54 is arranged so that there is a resulting force tending to rotate the latch lever 44 in a counter clockwise direction. This produces a force of engagement between the cam follower 41 and the cam segment 38. Since the line of action of the force of engagement between the cam follower 41 and the cam segment 38 passes through the center of the cam wheel 36 there is no tendency for the cam wheel to rotate around its pivot 37. The proportions are also arranged so that the cam surface 39 is parallel to the axis of the plunger 42 so there is no component of force tending to move the plunger axially against the spring 47.

Figure 4:
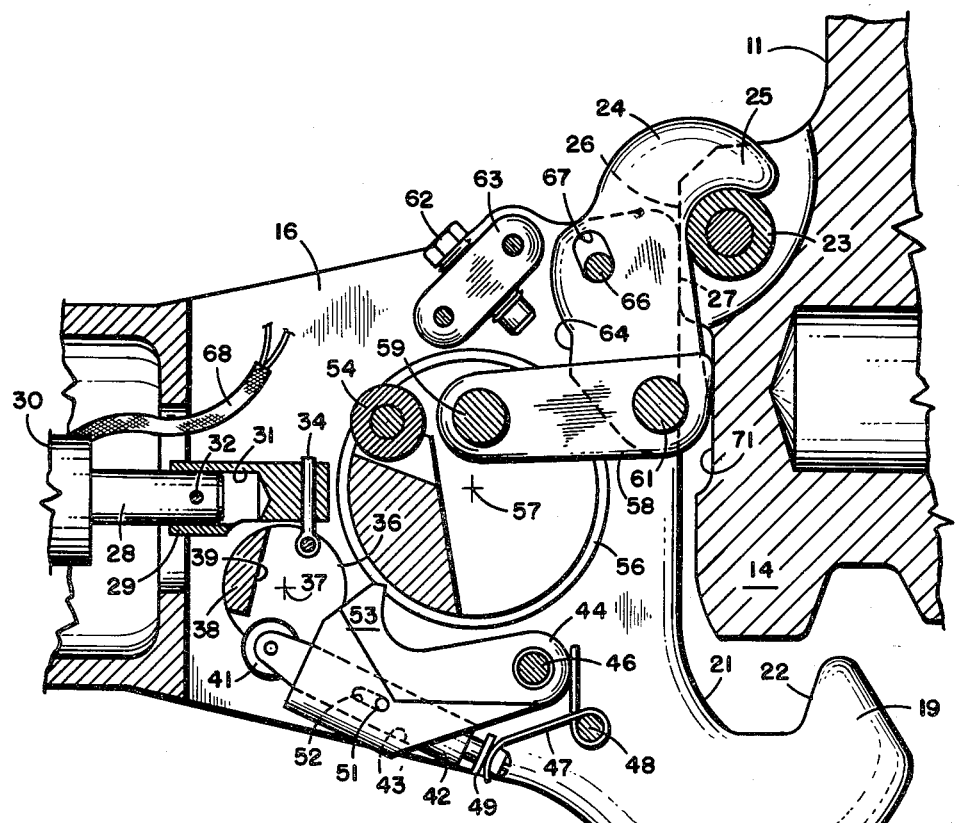
Figure 4 is a fragmentary view similar to Figure 3 showing a position of the mounting elements during the release of the wheel; and, Figure 5 is a fragmentary view partially in section showing the position of the element when the wheel is jettisoned.

When the wheel 17 is to be jettisoned, electrical energy is supplied to the solenoid 30 through the wire 68 and a separable plug connection 69. This moves the plunger 28 to the right and rotates the cam wheel 36 around the pivot 37. As soon as the line of action of the engagement between the cam follower 41 and the cam segment 38 is inclined relative to the axis of the plunger 42, the plunger will slide axially relative to the latch lever 44. This causes the line of action of the force of engagement between the cam follower 41 and the cam segment 38 to be displaced from the axis 37 so that a moment will be developed assisting the solenoid in the rotation of the cam wheel 36. This continues until the cam follower 41 clears the cam segment 38 as shown in Figure 4 and the hook portion 53 releases the roller 54. Those skilled in the art will recognize that this operation eliminates the possibility of partial release of the cam follower. The tension in the toggle link 58 then rotates the toggle wheel 56 in a clockwise direction and the connection element pivots around the pin 66 until the elements assume the position shown in Figure 4 at which time the detachable axle 16 has moved downwardly relative to the lower telescoping member 11 until the hook 19 disengages the flange portion 14.

Normally the wheel is jettisoned before it has stopped rotating so that the gyroscopic action of the wheel holds the detachable axle 16 in a horizontal position and prevents it from rotating in a counter clockwise direction around the hook 25. Therefore it is necessary to provide a positive force to disengage the hook 25 from the roller 23 and complete the release of the detachable axle 16. I therefore provide a structure wherein the vertical force developed by the weight of the wheel and axle is translated into a horizontal force which urges the axle axially away from the lower telescoping member 11.

Figure 5:
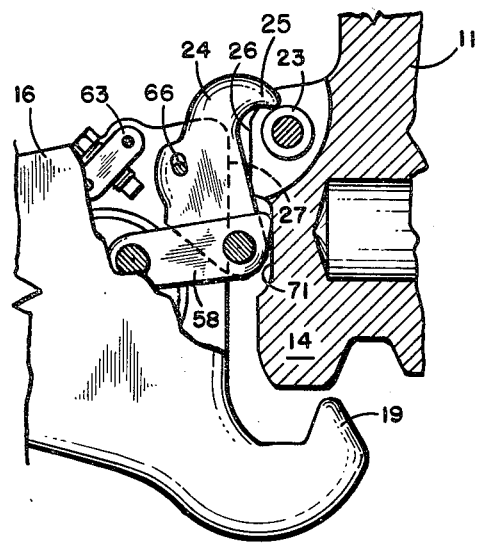

The weight of the wheel 17 and the detachable axle 16 produces an upward force on the hook 25 tending to turn the connecting element in the counter clockwise direction around the pin 66 beyond the position shown in Figure 4. Thus an engaging force is developed between the toggle link 58 and a vertical wall 71 formed on the lower telescoping member 11. This force of engagement moves the detachable axle 16 to the left and causes the connecting element 24 to move to the left to the position shown in Figure 5 at which time the hook 25 disengages the roller 23 and the wheel 17 is released. As the wheel 17 and detachable axle 16 fall away from the aircraft the detachable plug 69 separates and complete disconnection is achieved. Therefore the wheel 17 and the detachable axle 16 are free to fall to the earth. A rip cord 72 connected between the parachute and the lower telescoping member 11 may be utilized to open the parachute as it falls away from the lower telescoping member.

Those skilled in the art will recognize that by utilizing the structure shown, it is possible to actuate the release or latching mechanism with a very small force since the reaction of the mounting loads cannot be transmitted to the actuating mechanism.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:
1. A detachable wheel mounting for aircraft comprising a landing gear strut member adapted to be mounted on an aircraft, a detachable axle member on which is journaled a ground engaging wheel, connecting means including an element pivotally mounted on one of said members and movable into operative engagement with means on the other of said members whereby said members are secured together and movable into a release position whereby said members are disengaged, the weight of said axle member and wheel producing a rotational force moment on said element when it is in said unlocked position, and means on said element engageable with said axle member whereby said force moment produces a resulting axial force urging said axle member away from said strut member.

2. A detachable wheel mounting for aircraft comprising a landing gear strut member adapted to be mounted on an aircraft, a detachable axle member on which is journaled a ground engaging wheel, connecting means including a locking element movably mounted on said axle for movement relative thereto into operative engagement with means on the strut member whereby said members are secured together and movable out of engagement with said last means whereby said members are disengaged, said locking element being rotatable under the influence of the weight of said detachable axle member to a position wherein it is out of engagement with said last means, said locking element being formed with a portion engageable with said strut member upon movement out of engagement with said last means producing an axial separating force between said members.

3. A detachable wheel mounting for aircraft comprising a landing gear strut member adapted to be mounted on an aircraft, a detachable axle member on which is journaled a ground engaging wheel, connecting means including an element formed with a hook pivotally mounted on said axle for movement relative thereto into operative engagement with a cooperating element on said strut member whereby said members are secured together said element being rotatable under the influence of weight of said detachable axle member to a position wherein said hook disengages said co-operating elements and said members are disengaged, said element being formed with a portion engageable with said strut member producing an axial separating force reaction when said element rotates under the influence of the weight of said detachable axle member.

4. A detachable wheel mounting for aircraft comprising a landing gear strut member adapted to be mounted on an aircraft, a detachable axle member on which is journaled a ground engaging wheel, connecting means including an element pivotally mounted on one of said members and movable into operative locking engagement with means on the other of said members whereby said members are secured together, said element being rotatable by the weight of said detachable axle member out of engagement with said last means whereby said members are disengaged, said element being formed with a portion engageable with the other of said members producing an axial separating force reaction between said members when said element rotates under the influence under the weight of said detachable axle member.

References Cited in the file of this patent

UNITED STATES PATENTS

| | | |
|---|---|---|
| 2,637,512 | Albright | May 5, 1953 |
| 2,789,468 | Burns | Apr. 23, 1957 |

FOREIGN PATENTS

| | | |
|---|---|---|
| 685,830 | Germany | Dec. 27, 1939 |